J. W. FRAZIER.
COALING SYSTEM.
APPLICATION FILED JULY 23, 1915.
1,313,375.
Patented Aug. 19, 1919.
4 SHEETS—SHEET 1.
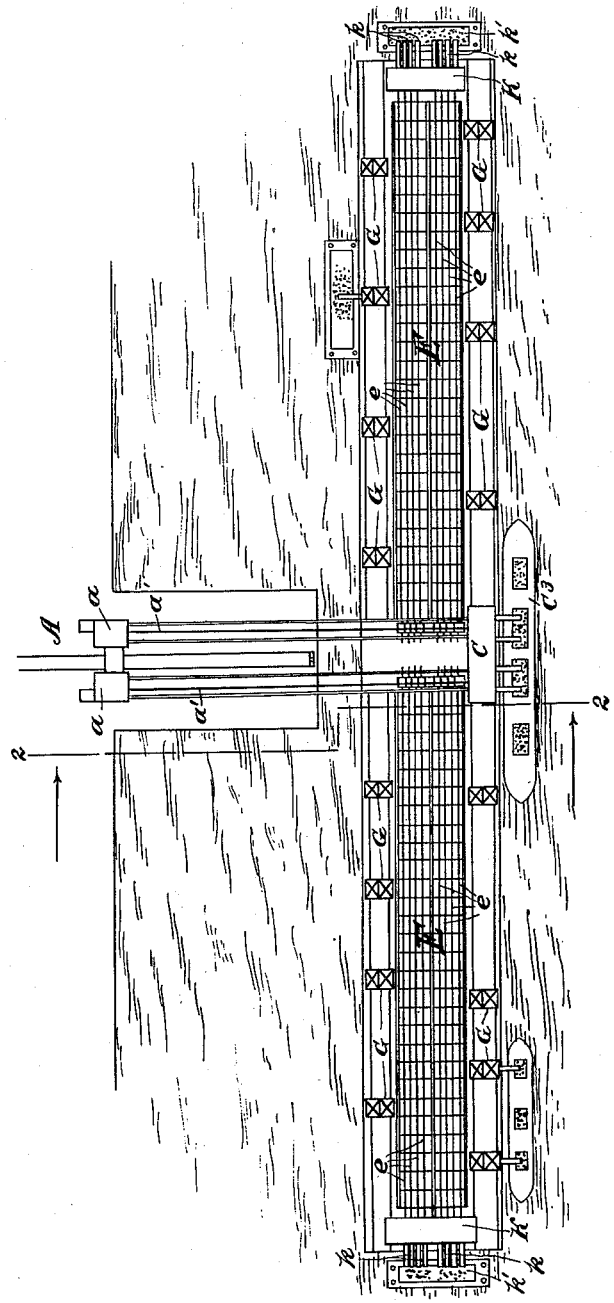

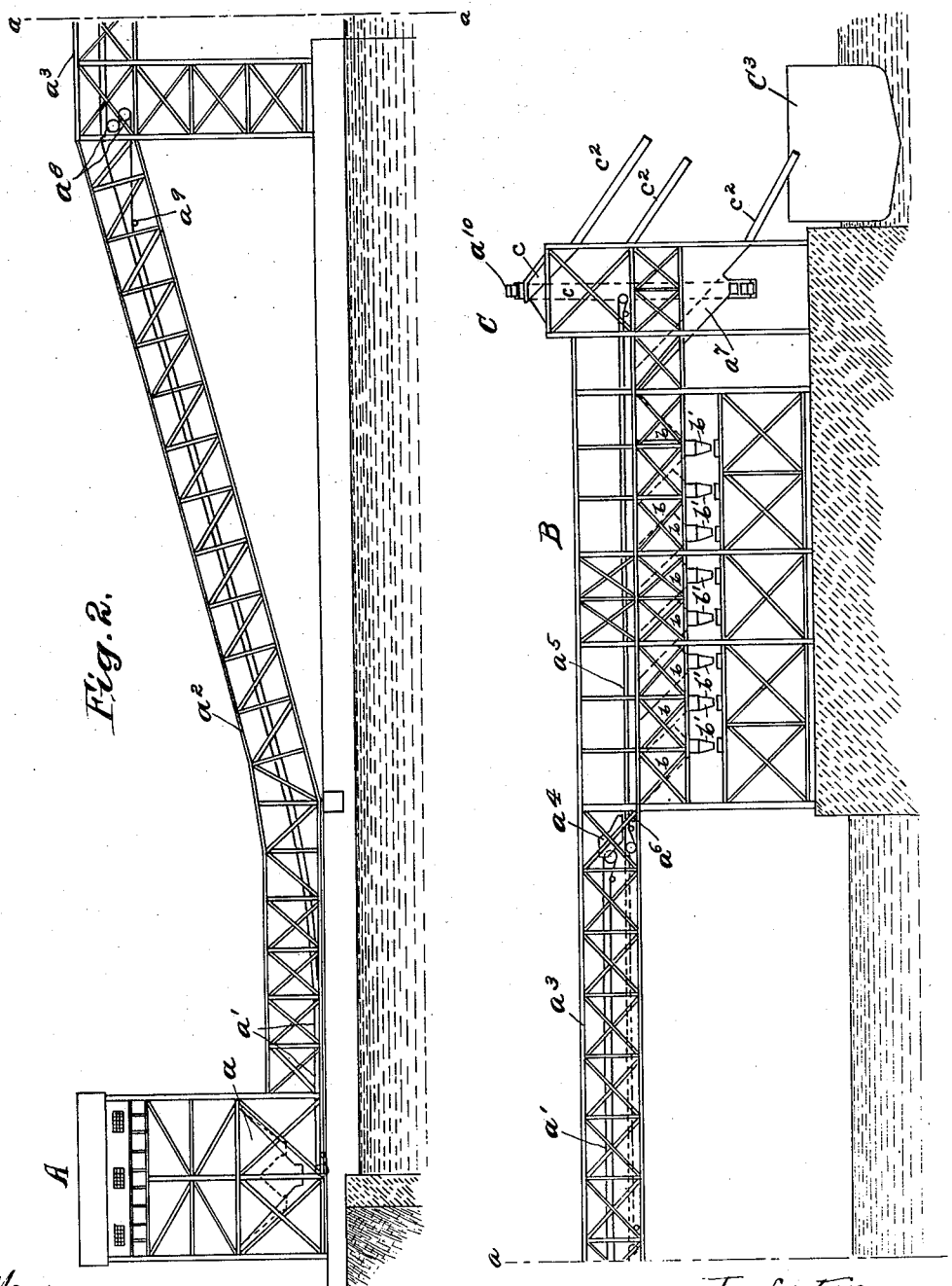

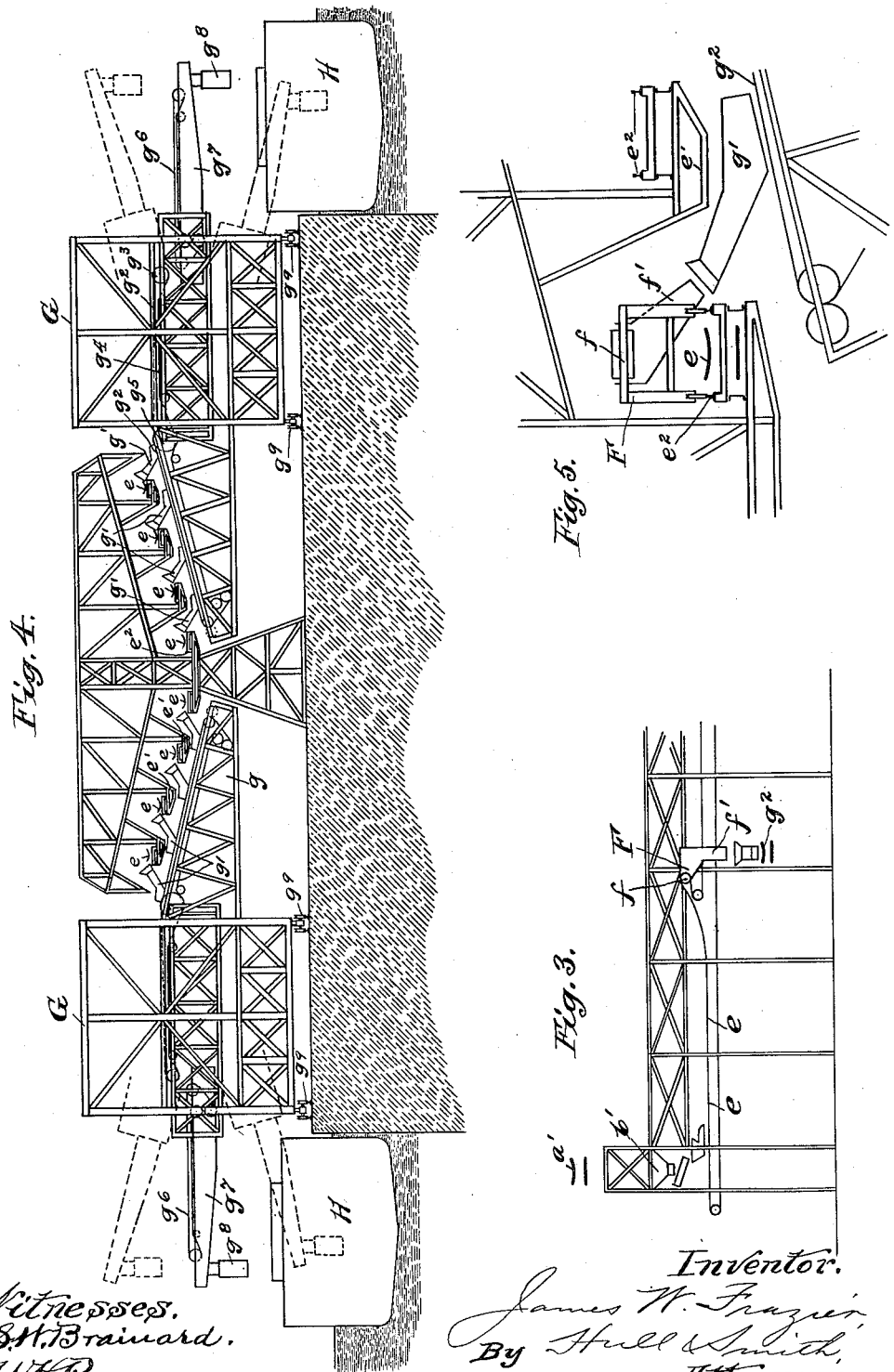

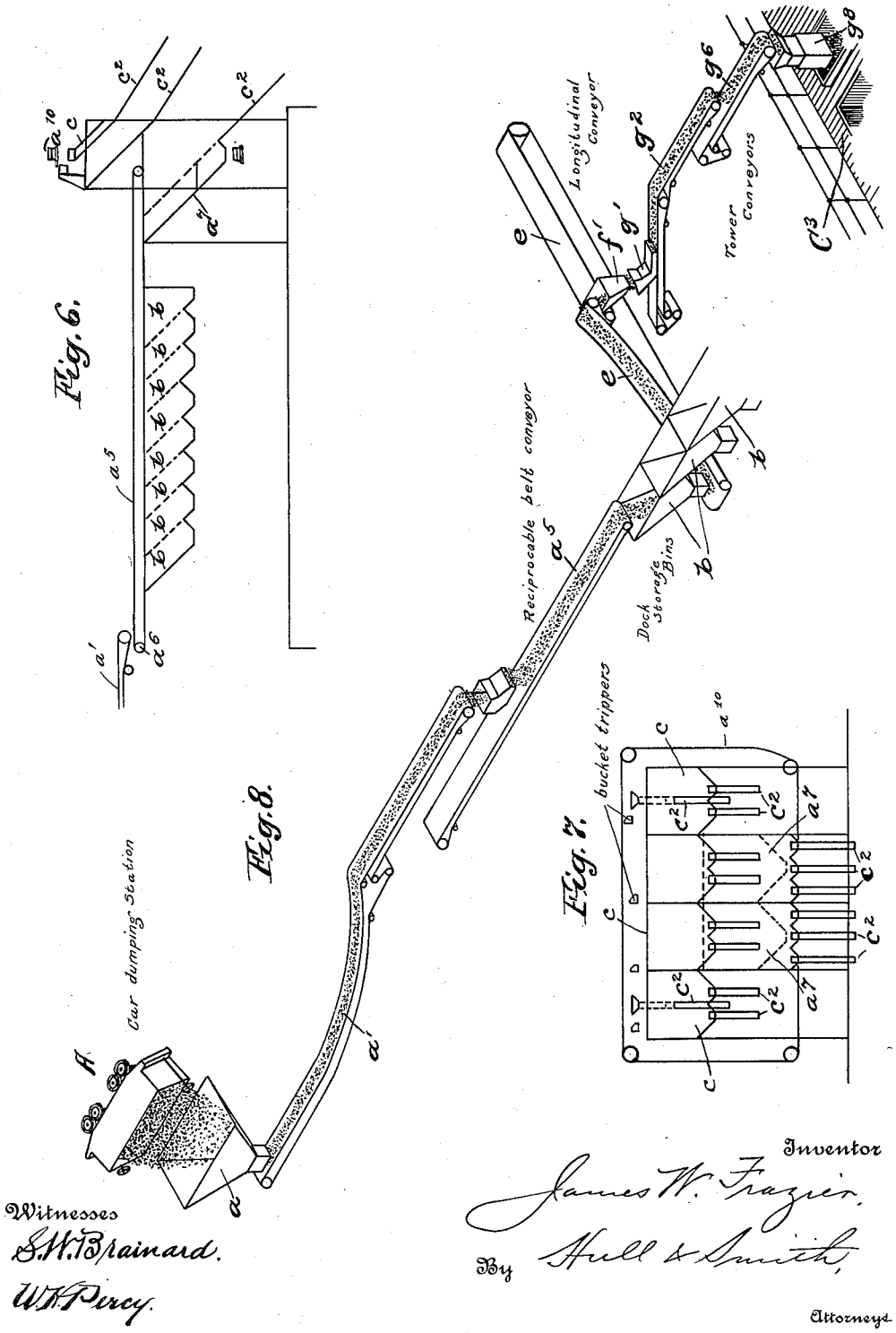

UNITED STATES PATENT OFFICE.

JAMES W. FRAZIER, OF CLEVELAND, OHIO.

COALING SYSTEM.

1,313,375. Specification of Letters Patent. Patented Aug. 19, 1919.

Application filed July 23, 1915. Serial No. 41,440.

*To all whom it may concern:*

Be it known that I, JAMES W. FRAZIER, a citizen of the United States, residing at Cleveland, in the county of Cuyahoga and State of Ohio, have invented a certain new and useful Improvement in Coaling Systems, of which the following is a full, clear, and exact description, reference being had to the accompanying drawings.

This invention relates to apparatus or systems whereby material (such as coal) may be conveyed from a suitable receiving station to a suitable distributing station (including a number of storage bins) whence it may be conveyed and delivered to suitable loading devices arranged to load a vehicle (such as a vessel) in a particularly efficient manner. It is the general object of the invention to improve the efficiency of apparatus of this type (and especially in certain particulars to be noted hereinafter) and to accomplish this result in and through a system which shall be relatively inexpensive of installation. Further and more generally speaking, the invention may be defined as consisting of the combinations of parts and elements embodied in the claims hereto annexed and illustrated, in my present preferred embodiment, in the drawings forming part hereof wherein Figure 1 represents a diagrammatic plan view of the system or installation from the car dumping or receiving station to the distributing station, said distributing station being in this case a dock; the two parts of Fig. 2 represent an enlarged vertical sectional view corresponding approximately to the line 2—2 of Fig. 1; Fig. 3 is a diagrammatic, longitudinal sectional detail of one unit or portion of the delivery station or dock; Fig. 4 a vertical sectional view taken through the delivery station or dock and a pair of opposed loading towers, the view being taken at right angles to that shown in Fig. 3; Fig. 5 an enlarged detail of one of the belt trippers on the dock with the coöperating portion of the loading tower therebeneath; Fig. 6 a detail showing the dock receiving bins and the bucket conveyer; Fig. 7 a view of said bins and conveyer taken at right angles to Fig. 6; and Fig. 8 a diagrammatic perspective view illustrating the path traversed by the material in one of the units from the receiving or car dumping station to the loading and discharge station at the dock.

The particular embodiment of my invention disclosed herein, although capable of use in connection with other material, is particularly designed with reference to the handling of frangible material, such as coal and, as shown herein, is composed of two symmetrical halves or units, and each unit comprises generally a receptacle or bin into which cars may be dumped in any suitable manner, one or more conveyer belts arranged beneath the receptacle or bin and conducting the material to a dock, a transversely arranged series of bins on the dock wherein the coal may be stored in accordance with size and quality, a system of conveyer belts extending under the said bins or receptacles longitudinally of the dock to bins at the end of the dock, a belt tripping mechanism associated with each of the last mentioned conveyer belts, said belt-tripping mechanism being longitudinally adjustable whereby the belts may be tripped at any desired point in the length of the dock, conveyers adapted to receive material discharged from any of the last mentioned conveyer belts, and vertically and longitudinally adjustable means for discharging material conveyed by the last mentioned conveyers into vessels or other suitable vehicles. Means are also shown whereby the material conveyed to the dock may, if desired, be conducted to a series of centrally arranged storage bins whence it may be discharged directly into a vessel without the intervention of the transverse series of bins and the conveying and loading devices associated therewith referred to above.

Describing by reference characters the various parts whereof each unit is composed A denotes a car dumping station where coal or other material may be dumped from cars (in any approved manner) into a bin indicated at $a$. This bin is preferably provided with a chute arranged above a belt conveyer $a'$, said conveyer being arranged to conduct the material (coal) to the dock. In the installation illustrated herein, the conveyers $a'$, $a'$ of the two units are carried by an inclined bridge $a^2$ to a second bridge $a^3$. Each conveyer is arranged to dump into a chute $a^4$ and to deliver its contents onto a longitudinally reciprocable conveyer $a^5$ therebeneath, said conveyer being mounted upon a suitable carriage the trucks whereof are indicated at $a^6$, the carriage being mounted on a track on the bridge $a^3$ beneath the conveyer $a'$ and upon a track extending transversely of the dock and forming an extension of the former track. It will be evident that, by moving the conveyer $a^5$ longitudinally beneath the conveyer $a'$, the material discharged from the conveyer $a'$ may in turn be discharged at any desired point beyond the end of said conveyer and within the range of movement of the conveyer $a^5$. The conveyers will be provided with suitable belt tightening pulleys and suitable guide pulleys, those for the conveyers $a'$ being indicated at $a^8$ and $a^9$, respectively. The pulleys $a^8$ may serve as drive pulleys. Each conveyer $a^5$ is adapted and arranged to discharge material into any one of a series of transverse bins on the dock, according to the longitudinally adjusted position of the conveyer $a^5$ beneath the conveyer $a'$.

If desired, the reciprocable conveyer $a^5$ may discharge the material supplied thereto from the conveyer $a'$ to a distributing station comprising a vertical series of bins at one side of the dock whence the material may be discharged through chutes directly into the hold of a vessel. For this purpose, a bucket elevator, indicated at $a^{10}$, may be employed, the elevator being arranged transversely with respect to the conveyer belt $a^5$ with the buckets on its lower branch in position to receive material discharged through the chute $a^7$, arranged beyond the series of bins $b$. The distributing station supplied by the bucket conveyer is indicated at C and may comprise a series of vertically and longitudinally spaced bins, as in Fig. 7, and each provided with a suitable bucket tripping device whereby, when the buckets on the conveyer are brought thereabove they may be tilted or inverted and discharge their contents into this appropriate bin $c$. Each bin is shown as provided with an adjustable chute $c^2$ adapted to discharge the contents thereof into a vessel $c^3$.

The system disclosed herein includes a particularly convenient and efficient arrangement whereby the coal (or other material) conveyed to the dock may be stored in two centrally located transverse series of bins and thence delivered from either or both series of bins in a like simple and efficient manner either to storage bins at each end of the dock or to any desired points or stations along the length of the dock and thence in turn into the holds of vessels or into other vehicles. For this purpose I employ, with each transverse series of dock storage bins, a set or series of conveyer belts extending longitudinally of the dock beneath said bins, the belts of one series extending in the opposite direction from the belts of the other series; also a suitable number of loading towers longitudinally adjustable with reference to the dock each having a bridge comprising a cantaliver section and a vertically swinging section having a conveyer thereon, the latter section supporting a longitudinally adjustable ram having a conveyer thereon adapted to receive the material from the first conveyer and to discharge the same to the point of final delivery for instance, the hold of a vessel. In this connection, I prefer to employ a frame work running substantially the length of the dock, the frame work being of cantaliver construction extending in opposite directions from the longitudinal central portion of the dock (whereby both sides of the dock may be employed with each unit for loading purposes) this frame work being provided with means for supporting the longitudinally extending conveyer belts, there being longitudinally adjustable belt trippers corresponding to the conveyer belts and adapted to be connected to the cantalivers or bridges of the loading towers, whereby the material on any longitudinal conveyer may be discharged upon the conveyer of any desired tower, no matter what may be the position of the tower along the dock.

For the purpose of such longitudinal adjustment of the towers and their loading bridges, each tower is mounted upon rails at the side of the dock whereby it may be moved at will to any desired position for loading a vessel. A portion of the bridge above each series of dock storage bins is indicated generally at B and the transversely arranged bins therebeneath are indicated at $b$ (see Fig. 2). Two transverse series of eight bins each are shown (one series for each bin) each bin being provided with a discharge chute $b'$, although it will be evident that the number of bins may be varied in accordance with the demands of any particular installation. The bins of each transverse series are arranged beneath one of the conveyers $a'$.

E denotes a frame work of double-cantaliver construction which is adapted to overhang the inclined cantalivers of the loading towers and which extends the length of the dock. This frame work carries the longitudinal conveyers which receive the material from the bins $b$. These conveyers are indicated at $e$ and, in the installation shown herein, two sets of eight conveyers each are carried by the frame work, each set of conveyers extending from the longitudinal central portion of the dock and of the frame work to one end of the dock, the conveyers of one set extending in the opposite direction from those of the other. By this arrangement, eight conveyers are provided for the eight bins of one unit (four on each side of the cantaliver frame) and serving to conduct the material therefrom to one end of the dock, while eight conveyers similarly arranged are also provided for the other unit, said conveyers extending in the opposite direction from the conveyers of the first unit and adapted to conduct the material to the opposite end of the dock. Each conveyer may be supported by a suitable bracket $e'$ carried by the frame E and each conveyer passes through a tripper, indicated generally at F, and comprising tripping pulleys $f$ around which the upper or carrying section of the conveyer is adapted to pass and a chute $f'$ extending downwardly from the discharging portion of the conveyer and above a suitable chute (to be referred to hereinafter in connection with one of the loading towers). The tripping devices are preferably mounted upon rails carried by the cantaliver frame and are movable therealong to different positions, corresponding to the position of the coöperating dock loading tower and bridge. The tripping mechanism F, as described thus far, is of well known construction and no claim is made in this application to the details thereof as described hereinbefore. Certain coöperating features between the tripping mechanism and the distributing mechanism on the loading towers, however, are believed to be novel, as well as the relation of the tripping mechanism to the general apparatus or system.

It will be observed that the brackets $e'$ are arranged in an outwardly and upwardly inclined series from the center of the frame E thereby to coöperate with the upwardly inclined contalivers of the loading towers. The chutes $f'$ of the tripping devices coöperate with chutes $g'$ carried by each cantaliver or bridge $g$ of a loading tower G. Four such chutes are shown as provided on each bridge or cantaliver $g$, one for each belt $e$ and tripper F. The bottoms of the chutes $g'$ are arranged above a conveyer belt $g^2$ which extends along the bridge or cantaliver $g$ and nearly across the body of the tower G, being supported by a bridge section $g^4$ in said tower, which bridge section forms an extension of and is pivoted adjacent to the cantaliver bridge section $g$, at the point $g^5$, the discharge end of this belt or conveyer being indicated at $g^3$. Coöperating with the adjacent end of the conveyer $g^2$ is a "shuttle" apron or reciprocable belt conveyer $g^6$ which is mounted upon a ram $g^7$ arranged below the conveyer $g^2$ and supported by the bridge section $g^4$. This ram is provided at its outer end with a chute $g^8$ which is adapted to receive the material discharged from the belt $g^6$ and discharge the same into the hold of a vessel, indicated at H. The belt trippers are movable along the tracks $e^2$, and are adapted to discharge into the chutes $g'$. The loading tower G is mounted upon track $g^9$ whereby it may be adjusted longitudinally with the dock into any position with reference thereto. As many of these loading towers G will be provided as may be necessary.

When desired, the conveyers $e$ may discharge into transversely arranged storage bins K at opposite ends of the dock, said bins being provided with chutes $k$ whereby the contents may be delivered into suitable vessels $k'$.

The operation is briefly as follows and will be apparent from the diagrammatic view of one of the units shown in Fig. 8. Material conducted to the receiving station A may be discharged into the bins $a$ and thence conducted by the conveyer belts $a'$ to the bins $b$ on the dock. Such quantity of coal (or other material) as may be necessary will be discharged into the storage bins $c$ (not shown in Fig. 8) through the use of the bucket conveyer, whence the material may be discharged into a vessel $c^3$. Such material as may not be supplied to the vessel will be discharged either to the end bins K or to the dock loading machines or towers.

The apparatus or system disclosed herein, while comparatively simple and economical of production and installation, is particularly efficient in operation and especially in the matter of flexibility. Although including a comparatively small number of parts or mechanism, it is particularly well adapted for all the requirements of dock supply and loading. Furthermore it is capable of handling material subject to breakage (like coal) with practical immunity and is capable of withstanding and meeting all the ordinary requirements and incidents of use.

Having thus described my invention, what I claim is:—

1. In a system of the character described, the combination, with a plurality of parallel conveyers, of a tripper coöperating with each conveyer, a movable tower having a conveyer arranged to receive material from the first mentioned conveyers, and chutes carried by said tower and coöperating with said trippers to deliver material therefrom to the last mentioned conveyer.

2. In a system of the character described, the combination, with a plurality of parallel conveyers, of a tripper coöperating with each of said conveyers, a conveyer extending at an angle with respect to the first mentioned conveyers and movable longitudinally thereof, and chutes arranged to deliver material on the last mentioned conveyer and coöperating with said trippers.

3. In a system of the character described, the combination, with a plurality of parallel conveyers, of a conveyer extending at an angle with respect to the first mentioned conveyers, a plurality of devices coöperating with the last mentioned conveyer and each adapted to receive material from one of the first mentioned conveyers whereby the material on any one of such first mentioned conveyers may be delivered to the angularly extending conveyer and means for moving the last-mentioned conveyer in a direction longitudinally of the parallel conveyers.

4. In a system of the character described, the combination, with a series of parallel conveyers and means for delivering material thereto, of a bridge movable longitudinally of said conveyers and having a conveyer thereon extending at an angle with respect to the first mentioned conveyers, a tripper for each of the first mentioned conveyers and movable longitudinally thereof, chutes carried by said bridge and each adapted to coöperate with a tripper to discharge material therefrom upon the bridge conveyer, and an adjustable ram movable with said bridge and having a conveyer adapted to receive material from the bridge conveyer.

5. In a system of the character described, the combination, with a plurality of parallel conveyers and means for delivering material thereto, of a tripper coöperating with and movable longitudinally of each of said conveyers, a tower having a bridge portion extending beneath the said conveyers and a pivoted extension of such bridge portion, a conveyer on such bridge portions of the tower, means whereby the material on any one of the first mentioned conveyers may be discharged on to the bridge conveyer, and a movable ram carried by the tower and having a conveyer coöperating with the bridge conveyer.

6. In a system of the character described, the combination, with a plurality of conveyers each having a tripper movable longitudinally thereof, of a tower movable longitudinally of said conveyers and provided with a bridge portion projecting beneath the said conveyers and with a pivoted extension of such bridge portion, a conveyer on the bridge portions of such tower, and chutes carried by the first mentioned bridge portion and each adapted to coöperate with a tripper.

7. In a system of the character described, the combination, with a plurality of conveyers each having a tripper movable longitudinally thereof, of a tower movable longitudinally of said conveyers and provided with a bridge portion projecting beneath the said conveyers and with a pivoted extension of such bridge portion, a conveyer on the bridge portions of such tower, chutes carried by the first mentioned bridge portion and each adapted to coöperate with a tripper, a movable ram also carried by said tower, and a conveyer on said ram adapted to receive the material from the bridge conveyer.

8. In a system of the character described, the combination, with a frame work having on each side thereof a plurality of conveyers extending longitudinally thereof, a tower on each side of said framework and movable longitudinally thereof, a conveyer on each tower extending in operative relation to the conveyers on the side of the framework adjacent thereto, and means whereby the material on any conveyer on either side of the framework may be discharged upon the tower conveyer adjacent to such side.

9. In a system of the character described, the combination, with a framework having on each side a conveyer extending longitudinally thereof, a plurality of towers on each side of said framework and movable longitudinally thereof, a conveyer on each tower extending in operative relation to the conveyer on the side of the framework adjacent thereto, and means whereby the material on the conveyer on either side of the framework may be discharged upon any of the tower conveyers adjacent to such side.

10. In a system of the character described, the combination, with a framework having on each side thereof a plurality of conveyers extending longitudinally thereof, a plurality of towers on each side of said framework and movable longitudinally thereof, a conveyer on each tower extending in operative relation to each of the framework conveyers on the side adjacent thereto, and means whereby the material on any of the conveyers on each side of the framework may be discharged upon the conveyer of each of the towers adjacent thereto.

11. In a system of the character described, the combination, with a double cantaliver framework, of a plurality of conveyers extending longitudinally on each side thereof, a tripper movable longitudinally of each conveyer, towers arranged on opposite sides of said framework and movable longitudinally of the conveyers, a bridge carried by each tower and projecting beneath the portion of the cantaliver framework adjacent thereto and beneath the conveyers carried by such portion, a conveyer upon each bridge, and chutes coöperating with each bridge conveyer and adapted each to coöperate with a tripper on the side of the framework adjacent thereto.

12. In a device of the character described, the combination, with a plurality of bins and a conveyer arranged beneath each of said bins, of a tripper for each conveyer and movable longitudinally thereof, a plurality of conveyers movable longitudinally of the first mentioned conveyers and extending at an angle therefrom, and means whereby material on any of the first mentioned conveyers may be discharged from its tripper upon each of the movable conveyers.

13. In a system of the character described, the combination, with two parallel series of conveyers, of a tripper movable longitudinally of each of said conveyers, a plurality of conveyers coöperating with each series of conveyers and movable longitudinally thereof, and means whereby material on any conveyer of each series may be discharged upon any of the movable conveyers coöperating with such series.

14. The combination, with a tower, of a bridge carried by said tower and adjustable with reference thereto, said bridge having an extension pivotally supported from said tower, a conveyer on said bridge and extension, a ram adjustably supported by said tower and adapted to form an extension of the end of said bridge opposite said extension, and a conveyer on said ram.

In testimony whereof, I hereunto affix my signature in the presence of two witnesses.

JAMES W. FRAZIER.

Witnesses:
J. F. POLAND,
ELSIE L. WALSH.